UNITED STATES PATENT OFFICE.

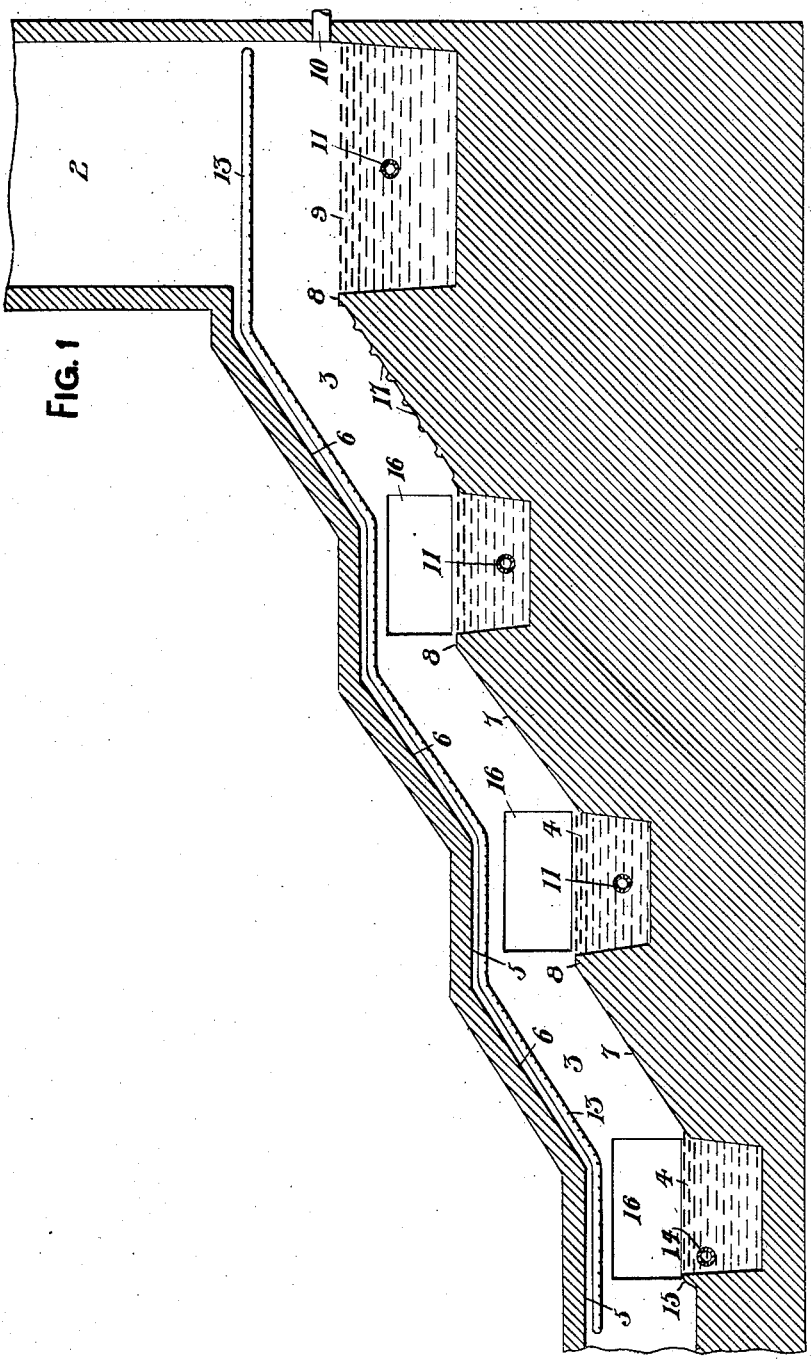

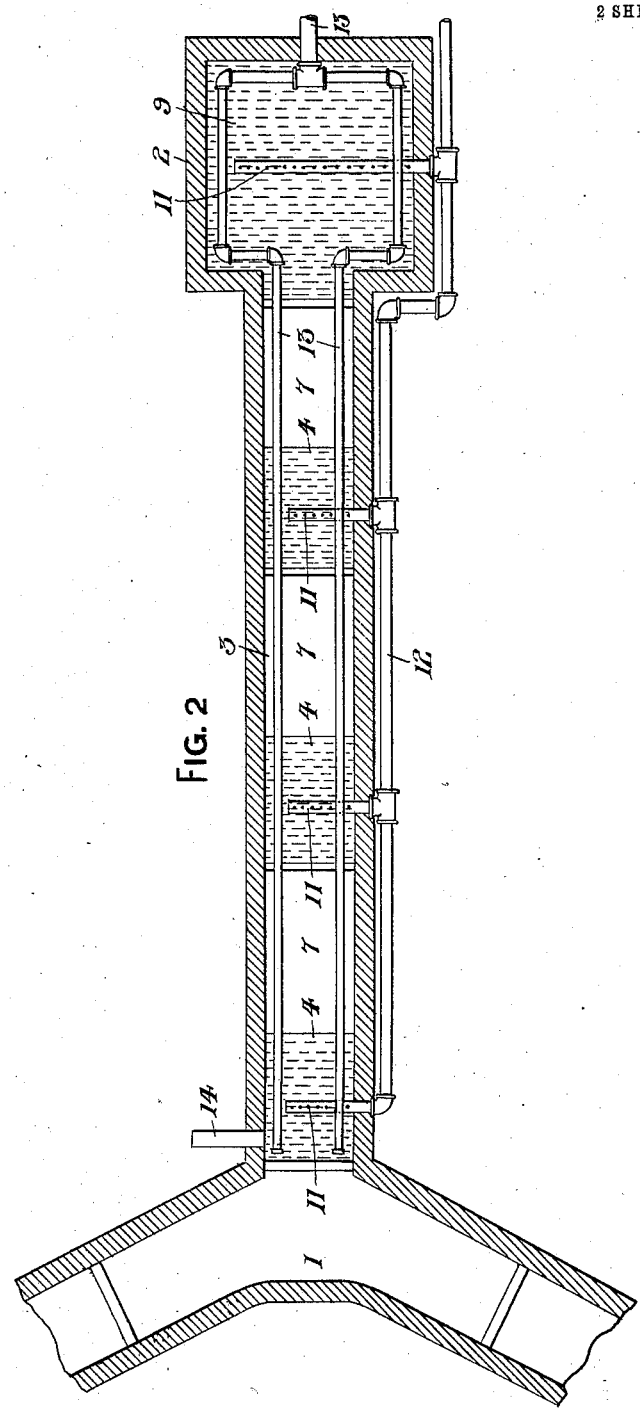

RICHARD ROBINSON, OF PITTSBURGH, PENNSYLVANIA.

GAS-PURIFIER.

1,016,290. Specification of Letters Patent. Patented Feb. 6, 1912.

Application filed March 23, 1911. Serial No. 616,329.

*To all whom it may concern:*

Be it known that I, RICHARD ROBINSON, a citizen of the United States, residing at Pittsburgh, in the county of Allegheny and State of Pennsylvania, have invented a new and useful Improvement in Gas-Purifiers, of which the following is a specification.

My invention aims to provide a new and practical flue or passage-way, constructively designed and intended to be utilized wherever it is desired to condense the fumes, gases, oxids, carbon, or other various products of combustion, to prevent said elements from escapement into the atmosphere, and to collect and retain said elements in the flue or elsewhere.

My invention further has for its object the condensation and removal of said obnoxious elements from the various products of combustion by means of a continuous flow of water introduced into the flue; also a means for agitating the water entering the series of collecting vats or receptacles, which I employ as elements of my invention.

My invention will be applicable and useful on any and all varieties of furnaces, boilers, smelters, and similarly designed heating or melting mediums, and aims to minimize the injurious effects to public health and vegetation, which is a natural result of allowing the various fumes, gases, oxids, or carbons to escape into the atmosphere.

I am aware that inventions of a somewhat similar nature and intention have been heretofore used, but I am not aware, and believe to be new, the novel construction and arrangement of elements that I show in the accompanying drawings and describe in the specification herewith furnished, which sets forth one embodiment of my invention, but I reserve the right to make alterations and modifications therein, which will be within the scope of the claims appended hereto.

Referring then to the drawings Figure 1 is a horizontal section of my improved flue in communication with a stack, showing a plurality of fluid receiving receptacles and conductor pipes positioned therein, and Fig. 2 is a sectional plan view of the flue further illustrating the various conductor pipes.

Throughout the respective views the numeral 1 designates the furnace, retort, or other heating or melting compartment, and 2 the usual draft stack in communication therewith. Intermediate of the said furnace and stack is the peculiarly constructed flue which I intend using to carry out the fundamental objects of my invention. This said flue, designated generally by the numeral 3, is formed on an angle or incline of pre-determined degree, and positioned in the bottom portion of the slope, at stated intervals, are a plurality of vats or fluid receptacles 4; of any desired size, shape, and capacity. As will be seen by reference to Fig. 1 the top or ceiling 5 of the flue, directly over each vat, is constructed on approximately a horizontal plane, while the intermediate portions 6 of said ceiling is angled to a degree coinciding with the floor or bottom portion of said flue intermediate of the respective vats. This foregoing described construction will present an exterior configuration of stepped formation as shown in Fig. 1.

The floor of the flue presents a series of inclined segments 7, which alternate, and communicate at their lower extremities, with the said vats, the highest point 8 of each sloping segment being somewhat above the horizontal plane of the ceiling portions 5 which is directly over the vat immediately below. The function of this feature of my invention is not absolutely essential, but is preferably used for a purpose to be more fully described hereinafter. Immediately underneath the stack is a well or vat 9, which is preferably of a greater capacity than those which form the series in the bottom of the flue. Entering this said well 9, either above or below the overflow point 8, is a fluid supply pipe 10; which will be controlled by any suitable regulating valve means, not shown, while positioned in each of the respective vats 4 and 9, below the said overflow points 8, are perforated or slotted pipes 11, all of which are in communication with a common supply pipe 12. This said pipe 12 and laterals 11 serve to conduct to each of the vats comprising the series an agitating medium, which may be in the form of water, steam, air, or gas, and this feature also will be further described later on.

Entering through the stack above the well 9, and following the contour of the walls thereof, then continuing down the flue at each side, and adjacent to the ceiling portion, is a conductor pipe 13, which is perforated at stated intervals, or else slotted for its entire length, for the purpose of providing a spray of either water or steam, preferably the former; said pipe terminating in the flue at any suitable point. An outlet opening 14 of sufficient area in or adjacent to the lowest vat 4, serves to take care of all the excess or overflow of water as it finally reaches the lowest point in the flue, and obviates the possibility of any of said fluid entering the furnace; a raised lip 15 serving to further guard against this contingency. A continuous supply of fluid being admitted to the larger and highest vat 9, will overflow that portion, descend over the series of inclined surfaces 7, and fill the succession of vats 4.

In actual practice the various products of combustion, incidental to the character of work being accomplished by the furnace, or retort, will be drawn by the stack through the flue 3, and these various products of combustion will, owing to the novel construction of the flue, come in direct contact with the descending fluid, and by the time said products of combustion reach the stack they will be sufficiently filtered and condensed that the remaining volatile elements contained therein will be harmless when finally expelled into the atmosphere. The upwardly projecting portions 8, being somewhat above the horizontal plane of the ceiling portions 5 will, in addition to the sloping segments of the bottom portion, serve as baffles to retard the products of combustion in order that the full benefit of the washing medium can be acquired. In addition to the fluid descending over the sloping segments and filling the respective vats, a shower or spray of fluid down both sides of the flue, supplied by the pipes 13, will greatly enhance the value of the condensing process, and insure the maximum of efficiency in removing the obnoxious gases, fumes, oxids, or carbon from the said products of combustion.

Ordinarily the solids that are removed from the various products of combustion, and washed down by the inclining walls of the flue, would form a scum or crust on the surface of the fluid contained in the series of receiving vats 4, so in order to avoid this contingency I have provided the perforated or slotted pipe 11 positioned in each of said vats below the normal overflow point, through which an agitating medium, in the form of either water, air, steam, or gas, furnished from a common supply pipe 12, can be introduced to keep the fluid in said vats thoroughly stirred up. In this manner a large percentage of the condensed solids will be gradually forced to the lowest vat in the series, and finally expelled through the outlet orifice. 14. Any of the solids that will naturally settle to the bottom of said vats can be removed through the doors 16 provided in the walls of the flue, which doors also afford a means for removing or repairing the various supply pipes and for access to the flue or stack. If desired the sloping segmental bottom sections of the flue can be corrugated as shown in Fig. 1, thereby providing a plurality of overflowing pockets 17, which, in addition to the vats 4 and 9, will serve to retain part of the solids extracted from the products of combustion.

I do not confine myself to the agitating means shown in the drawing and described herewith, as any other suitable means, such for instance as a mechanically operated paddle or other equivalent, not shown however, could be substituted and still be within the scope of the claims appended hereto. Other modifications in the detail form of construction are also reserved which will likewise be within the scope of the claims and original spirit of my invention.

The solids extracted from the various products of combustion can be collected in a suitable receptacle, not shown, after passing through the outlet 14, and, together with that accumulated in the respective vats or corrugated slopes, reclaimed for commercial use.

What I claim is:

1. The combination with a furnace and draft stack, of an inclined flue intermediate of said furnace and stack; a plurality of fluid retaining vats arranged in spaced relationship in the bottom of said flue; inclined surfaces connecting said vats; a receiving well below the stack; means for supplying fluid to the said well; an agitator element positioned in each vat and well; an overflow orifice; and means for setting up a spray or shower of fluid within the flue.

2. An angularly disposed flue intermediate of a heating chamber and draft stack; a plurality of fluid retaining receptacles in the bottom of said flue; a receiving well below the stack; means for furnishing a continuous flow of fluid to said well and receptacles; means for furnishing a shower or spray of fluid in the flue; an agitating element in each receptacle; an over-flow orifice; and means, communicating with each receptacle through the walls of the flue, for removing the contents of said receptacles.

In testimony whereof I affix my signature in the presence of two witnesses.

RICHARD ROBINSON.

Witnesses:
A. E. FORTLAGE,
GEO. K. ROBERTSON.

Copies of this patent may be obtained for five cents each, by addressing the "Commissioner of Patents, Washington, D. C."